United States Patent [19]

Piatt

[11] Patent Number: 4,853,711

[45] Date of Patent: Aug. 1, 1989

[54] COMPACT PRINTER WITH ADJUSTABLE SHEET STORAGE CASSETTE

[75] Inventor: Michael J. Piatt, Enon, Ohio

[73] Assignee: Eastman Kodak Company, Rochester, N.Y.

[21] Appl. No.: 192,568

[22] Filed: May 11, 1988

[51] Int. Cl.[4] .................... G01D 15/28; G03B 27/58; B65H 1/08

[52] U.S. Cl. .............................. 346/134; 346/76 PH; 271/127; 271/162; 355/321

[58] Field of Search .......................... 346/76 PH, 136; 271/127, 162; 355/35 H, 145 H

[56] References Cited

U.S. PATENT DOCUMENTS 4,621,272 11/1986 Toriumi et al. .................... 346/134
4,660,823 4/1987 Sato ...................................... 271/22
4,752,785 6/1988 Isobe ................................... 346/136

*Primary Examiner*—E. A. Goldberg
*Assistant Examiner*—Gerald E. Preston
*Attorney, Agent, or Firm*—John D. Husser

[57] ABSTRACT

A compact printer of the kind having a sheet media print path to and through a print zone and an assembly for printing on media at the print zone includes a sheet cassette that is coupled to the bottom of the printer housing and rotatable on an axis generally normal to the bottom of the printer between: (i) a position with cassette edges generally flush with the side walls of the printer and (ii) a position wherein the length dimension of a supported sheet media stack is operatively aligned with the print path.

9 Claims, 4 Drawing Sheets

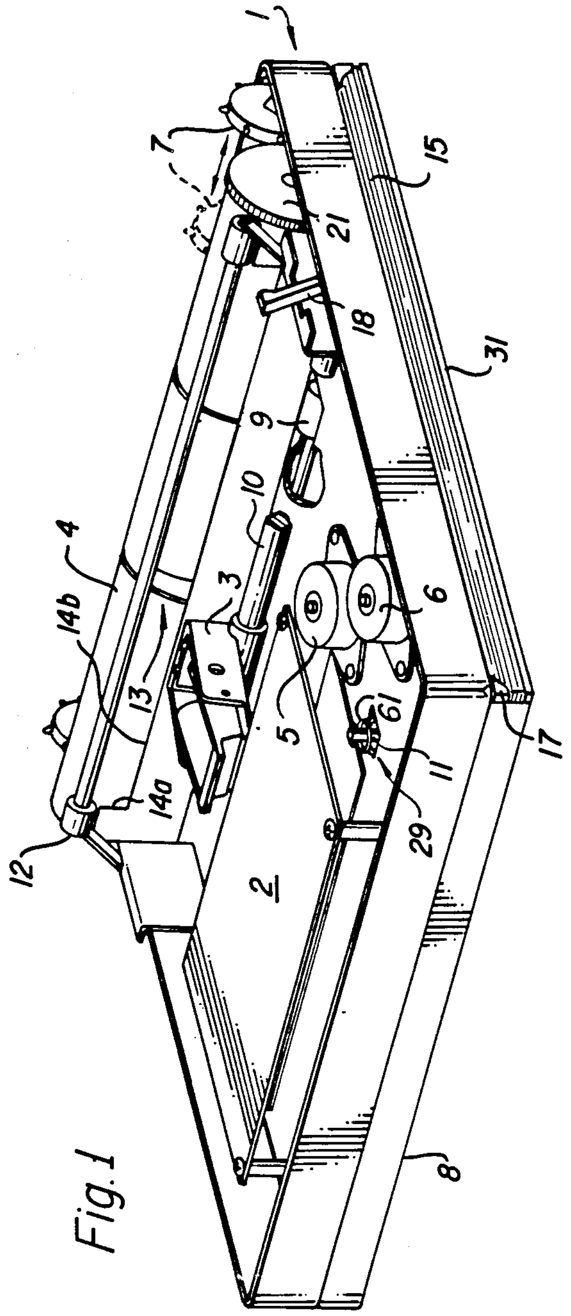
Fig. 1
Fig. 4
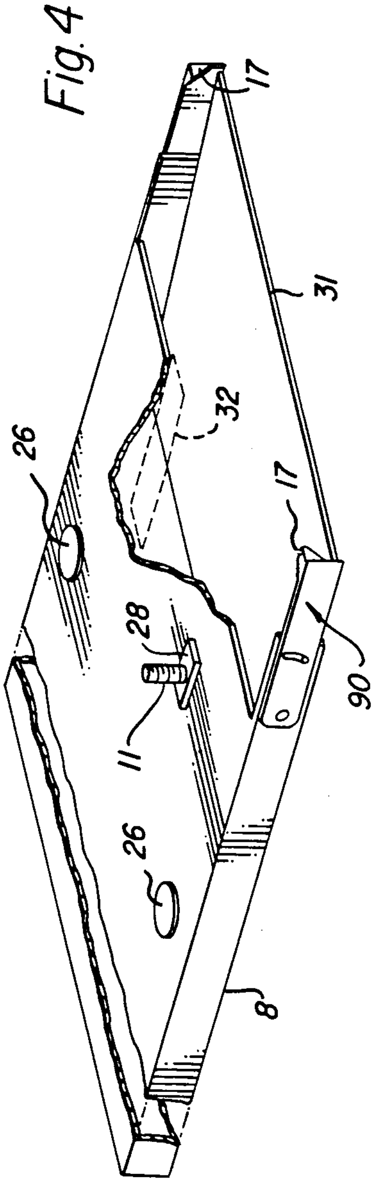

COMPACT PRINTER WITH ADJUSTABLE SHEET STORAGE CASSETTE

BACKGROUND OF THE INVENTION

1. Field of Invention

The present invention relates to small printers of the kind especially useful with lap-top computers and more specifically to an integral sheet storage and supply assembly for enabling such printers to be portable, in a sheet-loaded condition, with minimal footprint area.

2. Background Art

As computers have become less-expensive and more compact, the number of personal computer units has increased. Portable, "lap-top" computers are available that enable convenient owner transport between home and work, or on business trips. The portability of these computers raises a clear need for compatible printer units that are portable with equal convenience. For both the computer units and printer units of such portable systems, one premium features is compactness. Whether from the viewpoint of briefcase-volume or desk footprint area occupied, the users' desire for smallness is clear.

Several compact printer units have emerged successfully into the market, see e.g. the compact printer described in my U.S. Pat. No. 4,759,646, filed Apr. 24, 1986 and entitled "Compact Battery-Powered Printer", which shows the general configuration of the Diconix Model 150 printer. This printer configuration has been particularly attractive because of its smallness; however, it does not have the capability to store and feed sheets from an integral supply station.

U.S. Pat. Nos. 4,763,138 and 4,783,669, filed Mar. 2, 1987, describe a compact printer having a built-in sheet supply station and feeder. This printer gains compactness by combining sheet feed and transport functions in a single platen and by providing a drawer to receive and position a sheet supply. The sheet supply drawer can be moved to a position flush with the printer housing, when empty of sheets.

SUMMARY OF INVENTION

One important object of the present invention is to provide compact printers that incorporate the desirable features of built-in sheet storage and mechanized sheet feed, but also have enhanced compactness and capability for containing a sheet supply in the carrying disposition. Thus, an important advantage of printers constructed according to the present invention is that they are portable in a highly compact condition with a sheet stack stored therein.

In one preferred embodiment the invention constitutes, in a compact printer of the kind having a housing, means defining a sheet media print path to and through a print zone, and means for printing on such media at the print zone, a sheet media supply system comprising: (a) a sheet cassette coupled to the bottom of the housing for rotation on an axis generally normally to the bottom of the housing between: (i) a position with cassette edges are generally flush with printer side walls and (ii) a position wherein the length dimension of a sheet media stack within the cassette will align with the print path; and (b) means for feeding sheets from such a aligned stack into the print path of the printer.

BRIEF DESCRIPTION OF DRAWINGS

The subsequent description of preferred embodiments refers to the accompanying drawings wherein:

FIG. 1 is a perspective view of one preferred printer embodiment in accord with the present invention, having certain portions removed to facilitate the illustration of other portions;

FIG. 4 is a perspective view of the sheet cassette structure of the FIG. 1 printer, detached from the printer bottom; and FIGS. *5a, 5b* and *6a, 6b* are schematic diagrams useful in explaining the interface constructions of the sheet cassette and printer.

DETAILED DESCRIPTION OF PREFERRED EMBODIMENTS

Figure 3:
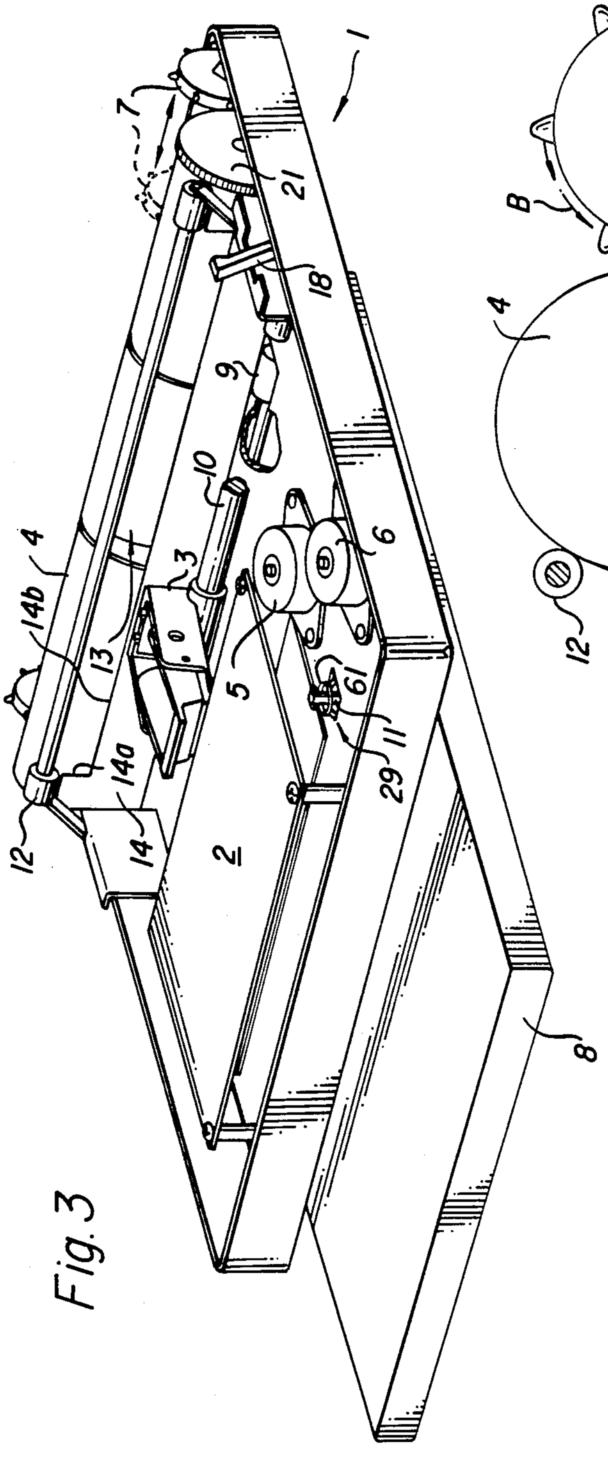
FIG. 3 is a perspective view, like FIG. 1, but with its sheet cassette in the printing orientation rather than the storage and carrying orientation.

The printer shown in FIG. 1 has a housing designated generally 1 with top, bottom and side walls that enclose the other printer components and whose inner surfaces can provide main frame support for the assembly of the printer components. Thus, printer platen 4 is mounted for rotation to advance print media from the bottom region of the printer, up through a print zone and out an opening in the top of the printer housing (or through an open top wall lid of the housing, not shown). A print carriage 3 is mounted on guide rail 10 to traverse the print zone 13 and print lines upon media fed therepast by platen 4. Stepper motors 5 and 6 are respectively coupled via drive transmission elements to traverse the print carriage 3 and rotate platen 4, under the control of the electronics on circuit board 2, which is located in the top front of the housing enclosure. The printer can be powered by batteries located within platen 4 as described in more detail in my U.S. Pat. No. 4,759,646, filed Apr. 24, 1986. The print carriage 3 is constructed to receive, position and connect an ink jet print cartridge in the manner described in more detail in U.S. Pat. No. 4,736,213, filed Dec. 22, 1986. A sheet supply casssette 8 constructed in accord with the present invention is shown in its carrying/storage position in FIG. 1 and will be described in more detail subsequently.

Figure 2:
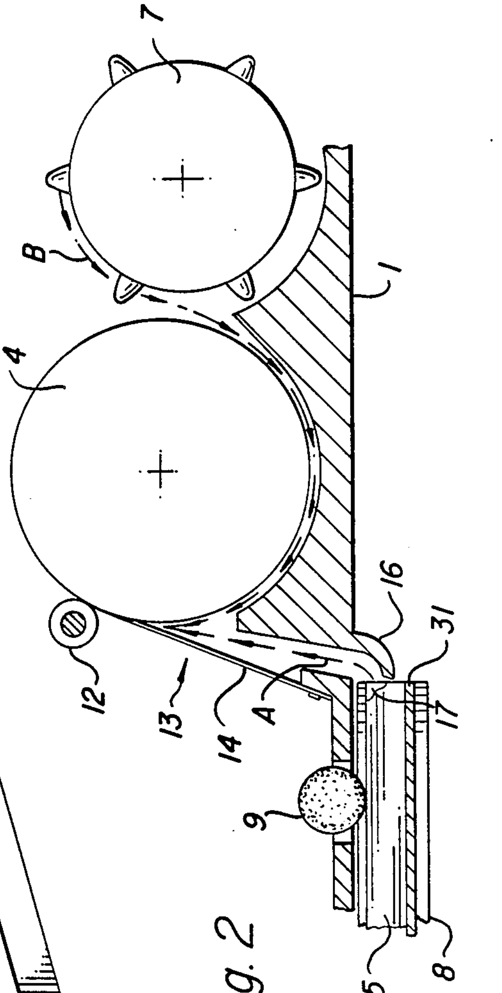
FIG. 2 is a cross-sectional schematic view illustrating components forming the sheet media feed path of the FIG. 1 printer.

Referring now to FIG. 2, the paper feed path is shown in more detail, with the sheet supply cassette 8 rotated 90° from FIG. 1, to its sheet feed position better shown in FIG. 3. Thus, upon actuation of sheet feed roller 9, a top sheet of paper is fed from stack 15 through buckle separators 17 on side members 90 and into the print path ingress defined by sheet guides 16, formed in the base of the printer. The lead edge of the fed sheet proceeds along the dotted arrow path A (shown in FIG. 2) between the extension of guide 16 and paper guide shim 14. As can be seen in FIGS. 1 and 2, edge portions 14*a* of guide shim 14 extend to the nips formed between platen 4 and bail rollers 12, and the central portion 14*b* of the shim plate is relieved to expose the print zone 13. The sheet supply container has a force plate 31 coupled to its lower wall to urge the leading portion of a contained sheet stack toward feed roller 9. FIG. 2 also shows how continuous print media can be fed over sprocket wheels 7 and beneath platen 4 from an opening in the rear wall of the printer, along the dotted arrow path B.

Considering now the adjustable sheet cassette feature of the present invention, it can be seen, by comparing FIGS. 1 and 3, that the cassette 8 is rotatable 90° with respect to the remainder of the printer, between the storage/carrying position shown in FIG. 1 and the sheet feeding position shown in FIG. 3. In the preferred embodiment shown in those Figures, such rotatable indexing of the cassette 8 is accomplished by the spring-loaded mounting (denoted generally 29) which couples the cassette 8 to the printer housing, with the cassette top wall urged toward the bottom wall of the printer.

Figure 5A:
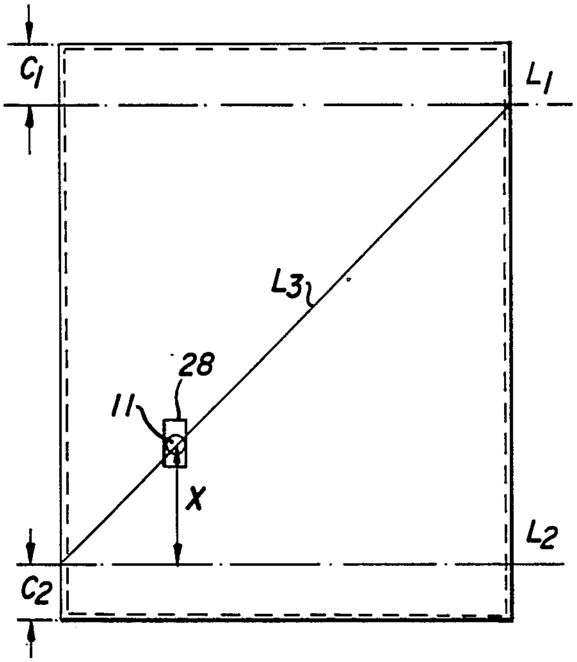
Figure 5B:
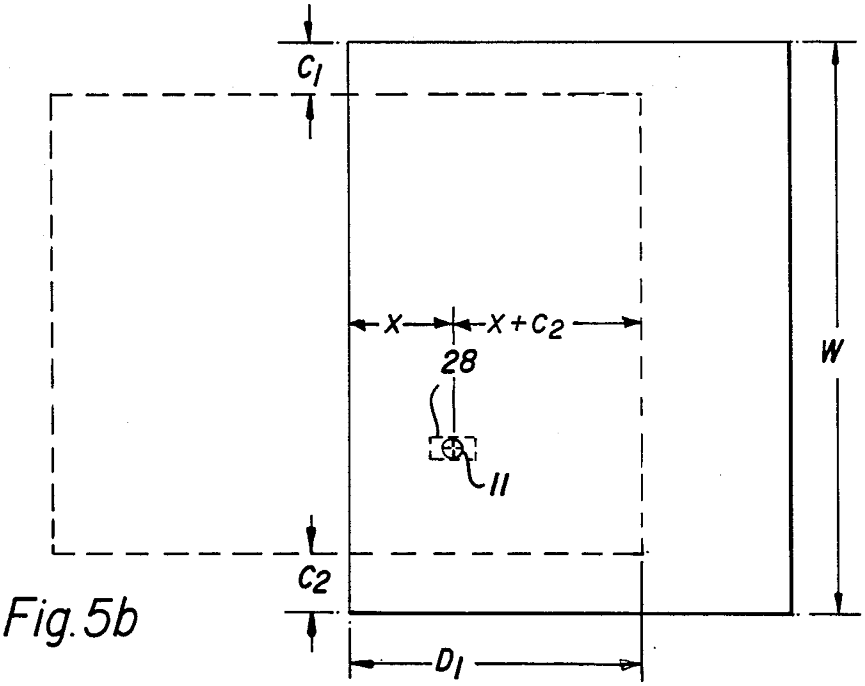

The detail construction of the sheet cassette 8 and its specific construction for rotation and detenting on the bottom of the printer can be seen more clearly in FIGS. 4, 5*a* and 5*b*. Thus, the cassette top wall has an attached, threaded pivot pin 11 that extends upwardly to protrude through the mounting hole in the bottom wall of the printer. Coil spring 61 is located around the portion of pin 11 that extends through the bottom hole and, during assembly, is compressed between a nut on the top of pin 11 and the bottom printer wall so as to urge the top of the container toward the bottom of the printer.

Figure 6A:
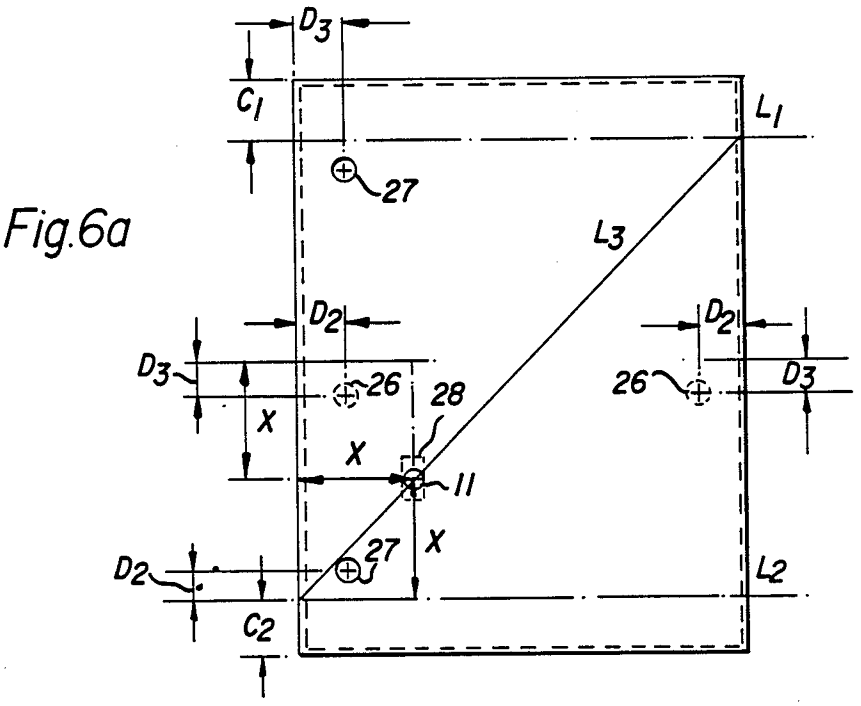
Figure 6B:
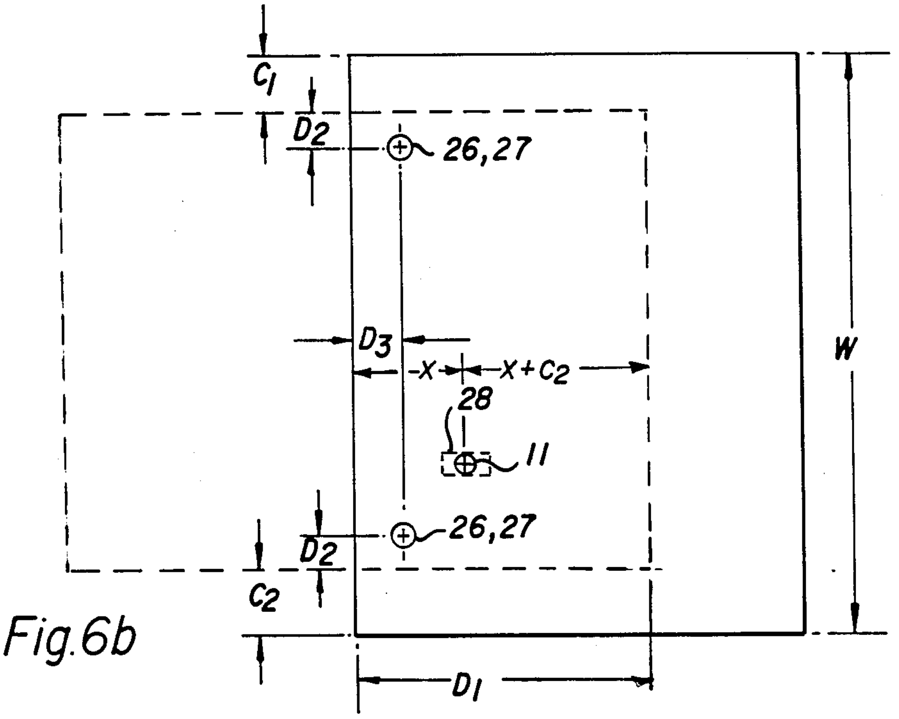

To provide for a shift between the FIG. 1 and FIG. 3 conditions by a simple rotation movement (of 90°), the locations of the cassette pin 11 and hole in the bottom of the printer wall cooperation are predeterminedly located as shown in FIGS. 6*a* and 6*b*. Also, the perimeters of cassette 8 and printer housing 1 are selected to be substantially the same size as the sheet media utilized in the printer (e.g., approximately $8\frac{1}{2} \times 11$ inches). In the storage position the housing and cassette perimeters are approximately coincident, one above the other (FIG. 1 and FIG. 6*a*) and the pin/hole rotation axis is located so that, in the 90° rotated sheet feed position (shown in FIGS. 3 and 6*b*), the cassette's longitudinal sides are centered with respect to the printer width (and thus the sheet feed path of the printer).

In order to allow easy sliding movement of the cassette during its condition-shift rotation (and to provide clearance for printer base guide 16 and the sheet feed roller which extends through a central portion of the printer bottom wall), bosses 26 are formed on the top wall of the cassette. As shown in FIGS. 6*a* and 6*b*, the printer bottom wall has two indent recesses 27 that are configured to receive two of bosses 26 in detent relation, when the cassette 8 has been rotated into the proper sheet feed position. Also the printer bottom wall has a slot 28*a* configured to receive a key portion 28*b* formed on the bottom of pivot pin 11, so that the cassette, and the exposed forward portion of its sheet stack, can move toward the printer bottom when properly indexed into the sheet feed condition. This allows the top sheet of a stack in the cassette to properly engage the feed roller 9, under upward bias of force plate 31.

From the foregoing discussion, it will be appreciated that proper location of the axis of rotation between the sheet cassette and the bottom of the printer is an important aspect of the present invention. FIGS. 5*a* and 5*b* are useful to explain one mode by which one skilled in the art can construct the proper interface axis. In this embodimet the rotation of the cassette is intended to be counterclockwise (90°) from the FIG. 5*a* storage condition to the FIG. 5*b* use position and the cassette is to be centered with respect to the dimension W of the printer housing when in the use position. Thus, the position of the cassette across the width of the printer (W) in the operational mode (FIG. 5*b*) can be determined. For example, if $W=11''(8\frac{1}{2}'' \times 11''$ paper), then $C_1=C_2=1.25''$. As one constructional parameter, the rotation axis should lie along line $L_3$ shown in FIG. 5*a*, that runs from the intersection of $C_2$ on the front edge of the printer to the intersection of $C_1$ along the back edge of the printer. This constructional parameter is also used when the cassette is not centered vis-a-vis the printer width W, i.e. where $C_1$ is not equal to $C_2$.

The next step is to determine the distance $D_1$ that the cassette overlaps the printer footprint in the operational mode. $D_1$ is determined from the component layout of the feed mechanism, e.g. the location of the feed roller 9 and ingress 16. Given a dimension for $D_1$, a specific point along line $L_3$ can be calculated for the rotation axis. Thus for the illustrated embodiment, where $C_1=C_2$ and $L_3$ is therefore at 45° to the printer walls the relation $D_1=C_2+2X$, can be used to calculate a distance X (see FIGS. 5*b* and 6*b*). The value for X thus calculated is the desired distance that a rotation point (lying along line $L_3$) should be from the line $L_2$, drawn parallel to the edge of the printer at a distance $C_2$ from the edge. The intersection of end of segment X and $L_3$ defines the point for the axis of rotation.

Similar calculations can be performed in cases where $C_1$ is not equal to $C_2$; however, in this instance the angle between the line $L_3$ and the side of the printer (e.g., say 0) will not necessarily equal 45°. In such situations the relation $D_1=C_2+Y \sin\theta+Y \cos\theta$ can be solved to determine a value of a segment lengths Y (along line $L_3$ from $L_2$-$L_3$ intercept point to the rotation axis).

FIGS. 6*a* and 6*b* illustrate one preferred mode for selecting the location of the detents 27 in the bottom of the printer and the bosses 26 on the cassette. Thus, the dimensions $D_2$ and $D_3$, as shown in FIG. 6b are chosen to provide good stability for the cassette. $D_3$ is of course $<D_1$. If $D_3<X$, the bosses 26 are closer to the center of the printer than the rotation axis, in the storage mode. If $X<D_3<2X+C_2$ the bosses 26 would be closer than the pivot point to the side edge of the printer. As previously mentioned, where $C_1$ is not equal to $C_2$, $L_3$ will not be a 45° segment; however, similar analysis can be used to determine desired positions of the basses 26.

FIG. 4 shows how the bottom wall of cassette 8 is segmented with a leaf spring connection 32 to provide an upward bias to the exposed, forward edge of a sheet stack edge. This configuration is described in more detail in concurrently filed U.S. application Ser. No. 07/192,569, entitled "Compact Printer Having Improved Sheet Cassette", which is incorporated herein by reference for its detail teaching of that structure. However, other more conventional force plates comprising an internally mounted pivot plate and spring can be used. The sheet feed roller 9 is preferably activated by selective coupling to the drive for platen 4, via lever 18 as described in my concurrently filed U.S. application Ser. No. 07/192570, entitled "Sheet Feed System For Compact Printer". The teachings of that application are incorporated herein by reference with respect to its sheet feed drive system; however other sheet feed drive systems can be utilized, e.g., one that selectively energizes a feed roller clutch by means of a switch on the printer keyboard.

As shown best in FIG. 1, one preferred way to load paper into cassette 8 is to index the cassette to the storage carrying position (shown in that Figure), manually depress the force plate and insert the sheet stack.

Above-referenced application Ser. No. 07/192/569, entitled "Compact Printer Having Improved Sheet Cassette", describes alternative preferred modes and constructions for loading paper with the cassette in its sheet feed position.

As will be clear from the foregoing description, the printer and coupled cassette are best transported and stored (e.g., on a desk or shelf) in the compact condition shown in FIG. 1. When it is desired to operate in a mechanized sheet feed print mode, the cassette 8 is indexed to the FIG. 3 position. After proper start-up procedures for the printer, the sheet feed roller is actuated, e.g., by moving lever 18 and stepper motor 6 advances a top sheet in the cassette past buckler separators 15, into ingress 16, under shim 14 and into the nip of bail roller 12 and platen 4. The platen rotation and sheet feed roller rotation are synchronized to yield a common peripheral velocity to avoid jamming a feed sheet between platen 4 and guide shim 14. Once the lead edge of the sheet is in the nip formed by platen 4 and roller 12, the sheet feed roller 9 is allowed to idle. Further sheet advance is effected by rotation of platen 4 as line-by-line printing is effected.

The invention has been described in detail with particular reference to preferred embodiments thereof, but it will be understood that variations and modifications can be effected within the spirit and scope of the invention.

I claim:

1. In a compact printer of the kind having a housing, means mounted in said housing for printing on lines of sheet media moved through a print zone and means for moving sheets from a sheet supply region to and through said print zone, and improved sheet storage and supply assembly comprising:

(a) a sheet cassette having top and bottom wall portions and side wall portions that define a sheet stack enclosure periphery approximately coincident to the side wall periphery of said printer housing; and (b) means for mounting said sheet cassette to the bottom of said printer housing so that said cassette is movable between:

(i) a storage carrying position wherein its side walls are approximately flush with the side walls of said printer housing; and (ii) a sheet folding position rotated approximately 90° on an axis generally normal to the bottom of said printer from said first position with said cassette side walls centered with respect to said print zone.

2. The invention defined in claim 1 further comprising means for detenting said sheet cassette in said storage and carrying sheet feeding positions.

3. The invention defined in claim 1 wherein said mounting means includes means for coupling said cassette and said printer for movements: (i) between said storage carrying and sheet feeding position in directions approximately parallel to the bottom of said printer and (ii) between detented and non-detented positions in directions approximately normal to the bottom of said printer.

4. The invention defined in claim 3 wherein said mounting means includes spring means for urging said cassette toward said printer bottom.

5. The invention defined in claim 4 further including means for detenting said cassette in said storage carrying and sheet feeding positions.

6. The invention defined in claim 5 wherein said detent means comprises cooperative recess and protrusion means.

7. The invention defined in claim 6 wherein said protrusion means is constructed to displace said cassette against said spring means during movement between said storage carrying and sheet feeding positions.

8. In a compact printer of the kind having a housing, means defining a sheet media print path to and through a print zone, and means for printing on media at said print zone, a sheet media supply system comprising:

(a) a sheet cassette coupled to the bottom of said housing and rotatable on an axis generally normal to the bottom of said printer housing between: (i) a storage-carrying position with cassette edges are generally flush with the side walls of said printer and (ii) a sheet feeding position wherein the length dimension of a supported sheet media stack is operatively aligned with said print path; and (b) means for feeding sheets from an aligned stack into said print path.

9. In a compact printer of the kind having a housing, means mounted in said housing for printing on lines of sheet media moved through a print zone and means for moving sheets from a sheet supply station to and through said print zone, an improved sheet storage and supply assembly comprising:

(a) a sheet cassette having wall portions of periphery substantially corresponding to the side wall periphery of said printer housing; and (b) means for coupling said sheet cassette and said printer housing so that said cassette is manually rotatable with respect to said housing from a storage-carrying position with its side walls flush with the side walls of said printer housing to a sheet feed position wherein supported sheets are operatively aligned with said print zone.

* * * * *